(12) United States Patent
Someya

(10) Patent No.: US 10,740,050 B2
(45) Date of Patent: Aug. 11, 2020

(54) NON-TRANSITORY PROCESSOR READABLE MEDIUM STORING PRINTER PROGRAM, TERMINAL, AND METHOD OF CONTROLLING TERMINAL USING URL SCHEME

(71) Applicant: SEIKO EPSON CORPORATION, Tokyo (JP)

(72) Inventor: Tomohito Someya, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/230,164

(22) Filed: Dec. 21, 2018

(65) Prior Publication Data

US 2019/0196760 A1   Jun. 27, 2019

(30) Foreign Application Priority Data

Dec. 27, 2017   (JP) .................................. 2017-251439

(51) Int. Cl.
*G06F 3/12*   (2006.01)

(52) U.S. Cl.
CPC ............ *G06F 3/1234* (2013.01); *G06F 3/121* (2013.01); *G06F 3/1253* (2013.01); *G06F 3/1261* (2013.01); *G06F 3/1292* (2013.01); *G06F 3/1236* (2013.01)

(58) Field of Classification Search
None
See application file for complete search history.

(56) References Cited

U.S. PATENT DOCUMENTS

| 2010/0231946 A1* | 9/2010 | Shozaki | H04N 1/00241 |
| | | | 358/1.13 |
| 2012/0013927 A1* | 1/2012 | Asai | G06F 3/1204 |
| | | | 358/1.13 |
| 2015/0156348 A1* | 6/2015 | Kittaka | H04N 1/00307 |
| | | | 358/1.14 |
| 2017/0310845 A1 | 10/2017 | Miura | |
| 2017/0322752 A1 | 11/2017 | Miura | |

FOREIGN PATENT DOCUMENTS

| JP | 2017-010089 A | 1/2017 |
| JP | 2017-021615 A | 1/2017 |
| JP | 2017-027182 A | 2/2017 |

* cited by examiner

*Primary Examiner* — Thomas D Lee
(74) *Attorney, Agent, or Firm* — Foley & Lardner LLP

(57) ABSTRACT

A non-transitory processor readable medium storing a printer program read out and executed by a terminal processor of a tablet terminal connectable to a printer, in which the printer program causes the terminal processor to acquire received URL scheme information which is information structured by a URL scheme and in which a process for when a communication error with the printer is generated is specified, from a browser app, and execute a reselection process of the printer based on the received URL scheme information when a communication error with the printer is generated.

15 Claims, 8 Drawing Sheets

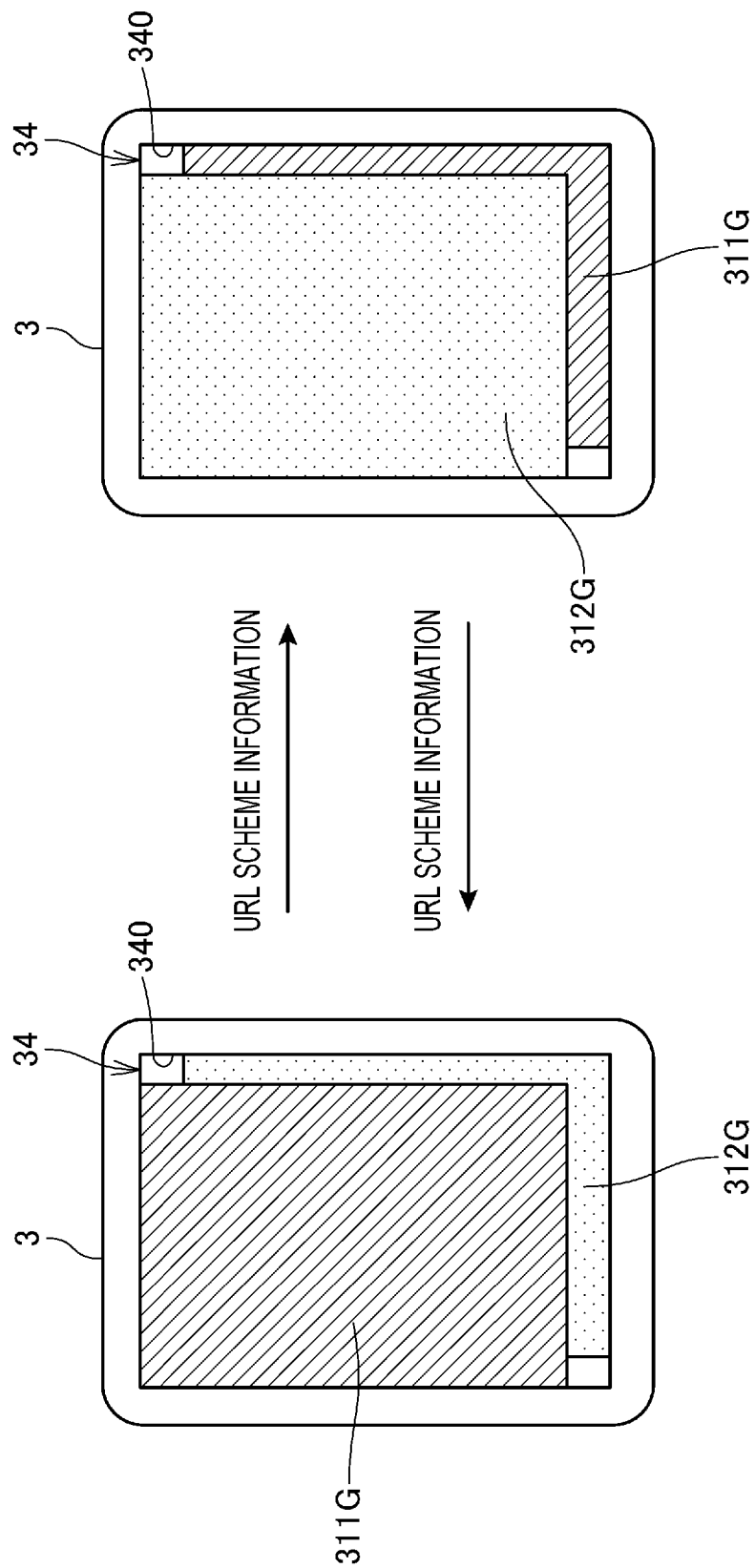

NON-TRANSITORY PROCESSOR READABLE MEDIUM STORING PRINTER PROGRAM, TERMINAL, AND METHOD OF CONTROLLING TERMINAL USING URL SCHEME

This application claims priority under 35 U.S.C. § 119 to Japanese Patent Application No. 2017-251439 filed on Dec. 27, 2017, the entire disclosure of which is expressly incorporated by reference herein.

BACKGROUND

1. Technical Field

The present invention relates to a non-transitory processor readable medium storing a printer program, a terminal, and a method of controlling a terminal.

2. Related Art

In the related art, there is known an application program which acquires information structured according to a Uniform Resource Locator (URL) scheme and which causes a process to be executed based on the acquired information (refer to, for example, JP-A-2017-10089). JP-A-2017-10089 discloses a technique in which a printing application, which acquires a URL scheme transmitted from an in-use application (application is abbreviated below as app) so as to execute a process related to a printer, displays an image of a display screen of the in-use app when switching from the display screen of the in-use app to a display screen of the printing app and suppresses a feeling of discomfort accompanying the switching from the in-use app to the printing app from being imparted to the user.

As described in JP-A-2017-10089, in a case where a printer is controlled from an upper level program (dominance program) such as an in-use app via a lower level program (subordinate program) such as a printing app, when a communication error with the printer is generated, the number of exchanges between the lower level program and the upper level program increases, and the period during which communication errors are generated may be prolonged.

SUMMARY

An advantage of some aspects of the invention is to make it possible to shorten the period during which communication errors with a printer are generated in consideration of the circumstances described above.

An embodiment of the invention is a non-transitory processor readable medium storing a printer program read out and executed by a processor in a terminal connectable to a printer to execute steps including acquiring first information which is structured by a URL scheme and in which a process when a communication error with the printer is generated is specified, from an upper level program of the printer program, and executing a reselection process of the printer based on the first information when a communication error with the printer is generated.

According to this configuration, the printer program of the non-transitory processor readable medium causes the processor of the terminal to execute a printer reselection process based on first information when a communication error with the printer is generated, which makes it possible to reduce the number of exchanges with the upper level program and to shorten the period during which communication errors with the printer are generated.

In addition, since the processor reads out and executes the printer program from the non-transitory processor readable medium, the upper level program is not notified of the generation of a communication error with the printer when a communication error with the printer is generated, and the upper level program is notified of the communication success when the reselection process is executed such that communication with the printer is successful.

According to this configuration, it is possible to reduce exchanges with the upper level program to the minimum necessary and to shorten the period during which communication errors with the printer are generated.

In addition, the terminal is provided with a display, and the processor reads out and executes the printer program from the storage medium to cause the display to display a reselection screen which is a screen for the reselection process when a communication error with the printer is generated and cause a display on the display to shift from the reselection screen to an upper level program screen showing the upper level program when the reselection process is executed such that the communication with the printer is successful.

According to this configuration, since a reselection screen is displayed in a case where a communication error with a printer is generated, and the reselection screen shifts to an upper level program screen in a case where a reselection process is executed such that communication with the printer is successful, it is possible to reduce the number of screen shifts to the minimum necessary. Accordingly, it is possible to suppress a feeling of discomfort due to the screen shift from being imparted to the user. In addition, since the screen shifts in a case where the communication is a success, it is possible for the user to easily recognize that the communication with the printer is successful.

In addition, the first information includes printing destination information which specifies a printer, printing information, and reselection process information, and the processor reads out and executes the printer program from the storage medium to cause the printer specified by the printing destination information to prepare to transmit the printing information, execute the reselection process based on the reselection process information when a communication error with the printer is generated, and change the printer for which the communication error is generated to the printer selected in the reselection process and transmitting the printing information.

According to this configuration, since the printing destination is changed to the printer selected in the reselection process to transmit the printing information in a case where a communication error with the printer specified by the printing destination information is generated, it is possible to promptly execute printing based on the printing information using the printer selected in the reselection process information.

In addition, the reselection screen displays printer information indicating the printer in a selectable manner and the printer information includes information acquired by broadcasting a command or information acquired from an operating system.

According to this configuration, since the reselection screen displays the information acquired by broadcasting a command or the printer information acquired from an operating system, it is possible for the communication with the reselected printer to reliably succeed. Accordingly, it is possible to prevent the reselection process from being executed a plurality of times, and to further shorten the period during which a communication error with the printer is generated.

A terminal according to another embodiment of the invention is able to communicate with a printer and includes a memory which stores a printer program and an upper level program of the printer program; and a processor which reads out and executes the upper level program and the printer program from the memory, in which the processor reads out and executes the upper level program from the non-transitory processor readable medium so as to generate first information, which is structured by a URL scheme and in which a process for when a communication error with the printer is generated is specified, and reads out and executes the printer program from the non-transitory processor readable medium so as to execute a reselection process of the printer based on the first information when a communication error with the printer is generated.

According to another embodiment of the invention, causing a processor of a terminal to execute a printer reselection process based on first information in a case where a communication error with a printer is generated makes it possible to reduce the number of exchanges with an upper level program and to shorten the period during which communication errors with the printer are generated.

In addition, according to still another embodiment of the invention, there is provided a method of controlling a terminal, which is able to communicate with a printer, the method including executing a printer program and an upper level program of the printer program, generating first information which is structured by a URL scheme and in which a process for when a communication error with the printer is generated is specified, using the upper level program, and executing a reselection process of the printer based on the first information when a communication error with the printer is generated, using the printer program.

According to this configuration, the method of controlling a terminal executes printer reselection process is executed based on the first information when a communication error with a printer is generated, which makes it possible to reduce the number of exchanges with the upper level program and to shorten the period during which communication errors with the printer are generated.

BRIEF DESCRIPTION OF THE DRAWINGS

The invention will be described with reference to the accompanying drawings, wherein like numbers reference like elements.

FIG. 4 is a diagram for illustrating a screen shift.

DESCRIPTION OF EXEMPLARY EMBODIMENTS

Figure 1:
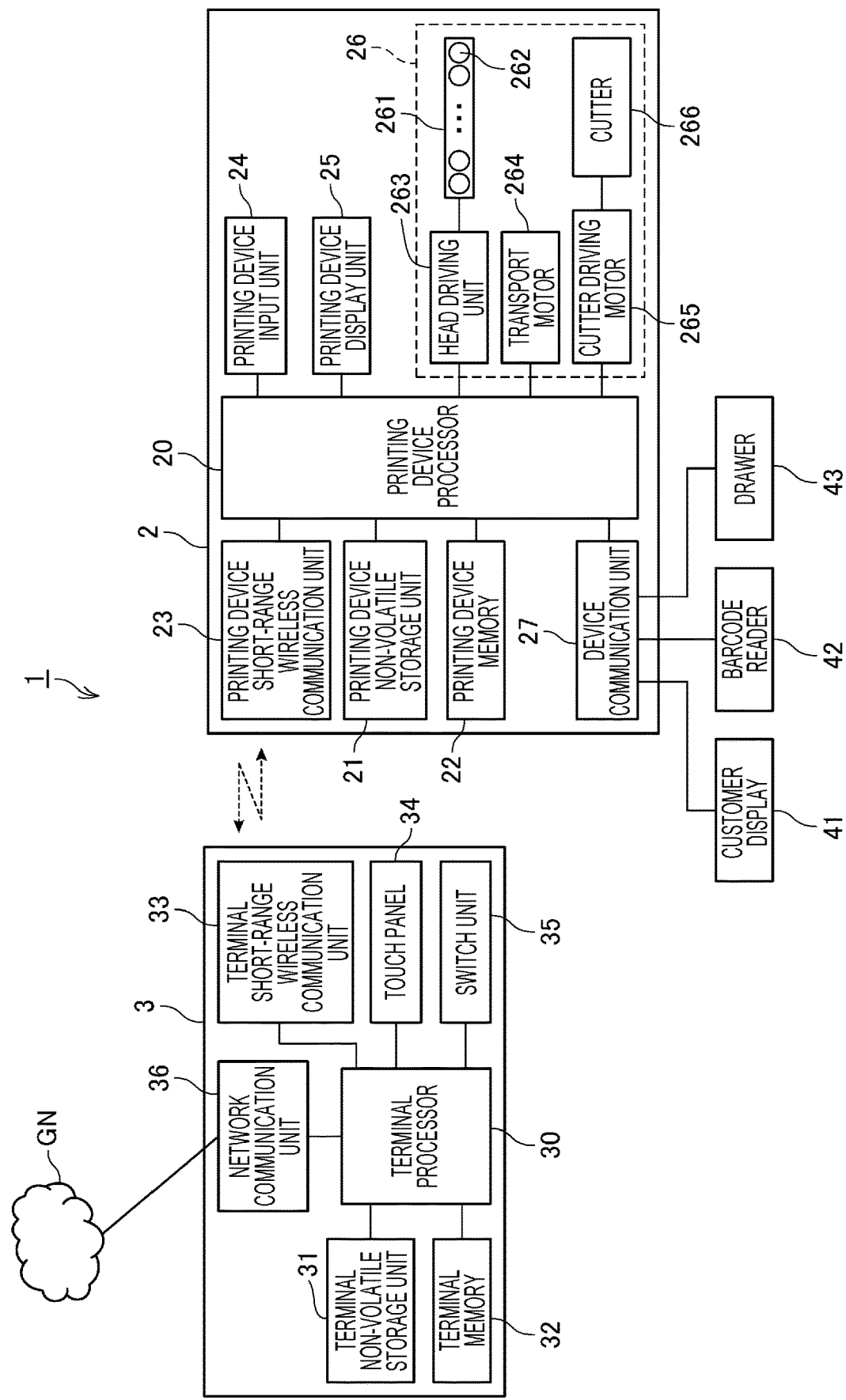
FIG. 1 is a diagram showing a configuration of a printing system.

FIG. 1 is a diagram showing a configuration of a printing system 1 according to one embodiment.

As shown in FIG. 1, the printing system 1 is provided with a printer 2 and a tablet terminal 3 (terminal). The printing system 1 is a POS system used in businesses such as retail businesses such as shopping centers, convenience stores, and sales on-board trains, and in the food and drink industry such as in restaurants, cafes, and pubs. The POS system is a system having a function of performing accounting for products purchased by a customer, a function of issuing receipts according to the accounting, and the like.

The printer 2 is a thermal printer which accommodates roll paper and forms dots on the accommodated roll paper with a line type thermal head 261 to print characters, images, or the like. The printing method of the printer 2 according to the present embodiment is a thermal method; however, the printing method of the printer 2 is not limited to the thermal method, and other printing methods such as an ink jet method may be used. In addition, the print head of the printer 2 is not limited to a line type, and may be a serial type.

The printer 2 is provided with a printing device processor 20, a printing device non-volatile storage unit (printing device non-volatile storage) 21, a printing device memory 22, a printing device short-range wireless communication unit (printing device short-range wireless communicator, communication port, communication circuit, communication connector, communication board) 23, a printing device input unit (printing device input button, switch, tach panel, user interface) 24, a printing device display unit (printing device display) 25, and a printing unit (printing mechanism) 26.

The printing device processor 20 is a processor which controls each unit of the printer 2. The printing device processor 20 is connected to the printing device non-volatile storage unit 21, the printing device memory 22, a printing device short-range wireless communication unit (printing device short-range wireless communicator, communication port, communication circuit, communication connector, communication board) 23, the printing device input unit 24, the printing device display unit 25, the printing unit 26, and a device communication unit (device communicator, communication port, communication circuit, communication connector, communication board) 27. The printing device processor 20 controls each unit of the printer 2 by transmitting and receiving data and signals to and from these units.

The printing device non-volatile storage unit 21 is configured by a flash memory or an Electrically Erasable Programmable Read Only Memory (EEPROM) and stores a program such as firmware which is read out and executed by the printing device processor 20 or various types of data in which a program is read out, executed and processed by the printing device processor 20.

In a case where the printing device processor 20 executes a program, the printing device memory 22 forms a work area for temporarily storing a program to be executed and data to be processed.

The printing device short-range wireless communication unit 23 is provided with a substrate formed by a circuit which communicates with the tablet terminal 3 in accordance with a communication standard relating to predetermined short-range wireless communication, such as, for example, Bluetooth (registered trademark), under the control of the printing device processor 20.

The printing device input unit 24 is provided with an input means such as an operation switch or a touch panel provided in the printer 2, detects a user operation on the input means, and provides an output to the printing device processor 20. The printing device processor 20 executes a process corresponding to the operation on the input means based on the input from the printing device input unit 24.

The printing device display unit 25 is provided with a plurality of LEDs, a display panel, and the like and turns on, turns off, or flashes the LED in a predetermined manner, displays information on the display panel, or the like, under the control of the printing device processor 20.

The printing unit 26 executes printing based on a control command received from the tablet terminal 3 under the control of the printing device processor 20. The control command is a command for specifying the printing of characters, images, or the like on the roll paper, and includes character codes, commands for printing character codes, or the like. This control command is a command of the command system corresponding to the printer 2. The printing unit 26 is provided with a thermal head 261, a head driving unit (head driver) 263, a transport motor 264, a cutter driving motor 265, and a cutter 266.

The thermal head 261 has a plurality of heat generating elements 262 formed of resistors arranged in a direction intersecting (for example orthogonal to) the transport direction of the roll paper. The thermal head 261 prints characters, images, and the like by energizing the heat generating elements 262 to generate heat and applying heat to the printing surface of the roll paper.

The head driving unit 263 controls energization of the heat generating elements 262 of the thermal head 261 under the control of the printing device processor 20.

The transport motor 264 rotates the transport roller and transports the roll paper under the control of the printing device processor 20.

Under the control of the printing device processor 20, the cutter driving motor 265 drives a movable blade forming the cutter 266 so as to slide toward a fixed blade, and cuts the roll paper.

The device communication unit 27 is provided with ports conforming to USB standards, ports conforming to serial communication standards other than USB (RS 232C or the like), ports conforming to parallel communication standards (IEEE 1284 or the like), ports conforming to communication standards relating to wired LANs (Ethernet (Registered Trademark), or the like), and an interface board formed of circuits having other ports. It is possible to connect devices to each port. Under the control of the printing device processor 20, the device communication unit 27 communicates with a device connected to the printer 2 via a port.

A customer display (external device) 41, a barcode reader (external device) 42, and a drawer (cash drawer, external device) 43 are connected to the printer 2 as external devices to be connected thereto.

Under the control of the printing device processor 20, the customer display 41 displays information relating to accounting. It is possible for the customer who is performing the accounting at the cashier counter to visually confirm the information displayed on the customer display 41.

The barcode reader 42 reads the barcode attached to the product, the package of the product, or the like and outputs data indicating the reading result to the device communication unit 27. The device communication unit 27 outputs the data input from the barcode reader 42 to the printing device processor 20.

The drawer 43 is a device provided with a tray for accommodating cash and the like and a mechanism which is able to withdraw the tray from the main body of the drawer 43.

Figure 2:
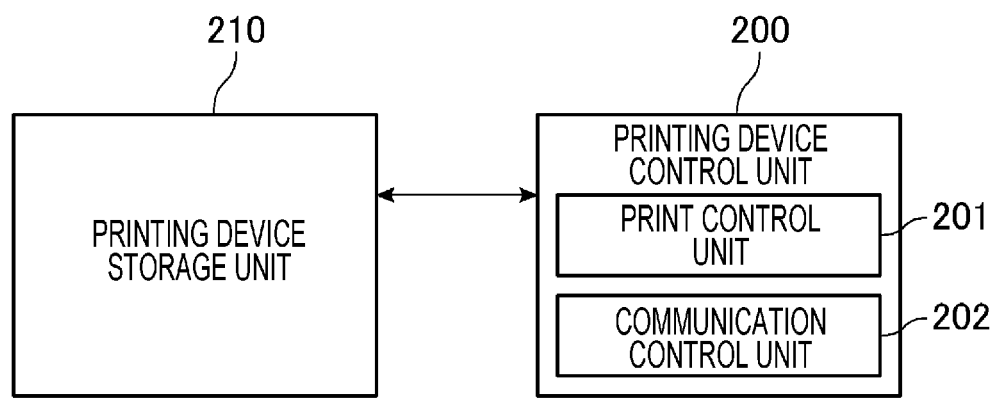
FIG. 2 is a functional block diagram of a printing device control unit (processor) and a printing device storage unit (storage).

FIG. 2 is a functional block diagram of the printing device control unit (printing device controller, CPU, processor) 200 and the printing device storage unit (printing device storage) 210 forming the control system of the printer 2.

The printing device storage unit 210 shown in FIG. 2 is a logical storage unit formed of the printing device non-volatile storage unit 21 and/or the printing device memory 22. The printing device control unit 200 and each functional unit of the printing device control unit 200 are formed by cooperation between software and hardware due to the printing device processor 20 executing a program. The printing device control unit 200 and each functional unit of the printing device control unit 200 are, for example, formed of the printing device processor 20, the printing device non-volatile storage unit 21, and the printing device memory 22.

The printing device control unit 200 has the functions of a printing control unit (printing controller, CPU, processor) 201 and a communication control unit (communication controller, CPU, processor) 202.

The printing control unit 201 controls the printing unit 26 to cause the printing unit 26 to execute printing based on a control command transmitted from the tablet terminal 3. Here, the printing includes the transportation of roll paper and the cutting of roll paper.

The communication control unit 202 controls the printing device short-range wireless communication unit 23 to cause the printing device short-range wireless communication unit 23 to execute communication with the tablet terminal 3.

Next, a description will be given of the tablet terminal 3.

The tablet terminal 3 is, for example, a tablet type (plate-shaped) terminal device provided with a touch panel 34 over a wide frontal region. At the time of accounting, the tablet terminal 3 functions as a host computer which controls the printer 2 by executing various processes related to the accounting.

The tablet terminal 3 is provided with a terminal processor 30 (processor, CPU), a terminal non-volatile storage unit (terminal non-volatile storage) 31, a terminal memory 32, a terminal short-range wireless communication unit 33 (communication unit, communicator, communication port, communication circuit, communication connector, communication board), the touch panel 34 (display unit, display), a switch unit (input button, tach panel, user interface) 35, and a network communication unit (communicator, communication port, communication circuit, communication connector, communication board) 36.

The terminal processor 30 is a processor which controls each unit of the tablet terminal 3. The terminal processor 30 is connected to the terminal non-volatile storage unit 31, the terminal memory 32, the terminal short-range wireless communication unit 33, the touch panel 34, the switch unit 35, and the network communication unit 36. The terminal processor 30 controls each unit of the tablet terminal 3 by transmitting and receiving data and signals to and from each unit.

The terminal non-volatile storage unit 31 is formed of a flash memory, an Electrically Erasable Programmable Read Only Memory (EEPROM), or the like, and stores programs to be read out and executed by the terminal processor 30 and various types of data which are read out by the terminal processor 30 to execute and process a program.

In a case where the terminal processor 30 reads out and executes a program, the terminal memory 32 forms a work area for temporarily storing a program to be executed and data to be processed.

The terminal short-range wireless communication unit 33 is provided with a substrate formed by a circuit which communicates with the printer 2 in accordance with a communication standard relating to predetermined short-range wireless communication, such as, for example, Bluetooth, under the control of the terminal processor 30.

The touch panel 34 is provided with a display panel such as a liquid crystal display panel and a touch sensor overlapping or integrally provided with the display panel. The display panel displays various images, various screens, and the like under the control of the terminal processor 30. The touch sensor detects touch operations and outputs the touch operations to the terminal processor 30. The terminal processor 30 executes a process corresponding to the touch operations based on the input from the touch sensor.

The switch unit 35 is provided with operators such as switches provided in a housing, and outputs an operation signal to the terminal processor 30 in a case where these switches are operated. The terminal processor 30 executes a process corresponding to the operated operator based on the operation signal input from the switch unit 35.

Under the control of the terminal processor 30, the network communication unit 36 communicates with a device (web server or the like) connected to a global network GN in accordance with a predetermined communication standard. The communication standard used by the network communication unit 36 for communication may be any standard such as HTTP, WebSocket, or the like.

FIG. 2 is a functional block diagram of a terminal control unit 300 (control unit, controller, CPU, processor) and a terminal storage unit 310 (storage unit, storage) forming the control system of the tablet terminal 3.

The terminal storage unit 310 shown in FIG. 2 is a logical storage unit formed of the terminal non-volatile storage unit (storage) 31 and/or the terminal memory 32. The terminal control unit 300 and each functional unit of the terminal control unit 300 are formed by cooperation between software and hardware due to the terminal processor 30 reading out and executing a program. The terminal control unit 300 and each of the functional units of the terminal control unit 300 are formed of, for example, the terminal processor 30, the terminal memory 32, and the terminal non-volatile storage unit 31.

The terminal storage unit 310 stores a browser application program (referred to below as a "browser app") 311 (upper level program, dominance program), and a printer application program (referred to below as a "printer app") 312 (a printer program and lower level program). In this relationship, the upper level program calls and executes the lower level program (subordinate program), and the lower level program is called and executed by the upper level program.

The browser app 311 is an application program for the terminal control unit 300 to function as a browser execution unit (controller, CPU, processor) 302 to be described below. The browser app 311 is installed in the tablet terminal 3 in advance.

The printer app 312 is an application program for the terminal control unit 300 to function as a print app execution unit 303 (controller, CPU, processor) to be described below. The printer app 312 is installed in the tablet terminal 3 in advance.

The terminal control unit 300 has the functions of an operating system (OS) 301, the browser execution unit 302, and the print app execution unit 303. The functions of the operating system 301 are the function of a control program stored in the terminal storage unit 310, and each of the other units are the functions of application programs to be executed with the operating system 301.

The browser execution unit 302 is a functional unit which realizes browser functions by the terminal processor 30 reading out and executing the browser app 311. The browser execution unit 302 downloads a web page described in a mark-up language such as HTML or a script language from a predetermined web server connected to the global network GN through a function of the browser. The data of the downloaded web page is stored in the terminal storage unit 310, for example. The browser execution unit 302 reads the data of the downloaded web page through the function of the browser, generates display data for displaying the web page, and displays the data using the touch panel 34. In addition, the browser execution unit 302 transmits the information structured according to the URL scheme (referred to below as URL scheme information) to the printer app 312 using a function of a script installed on the web page.

The print app execution unit 303 is a functional unit which relays between the browser execution unit 302 and the printer 2 by the terminal processor 30 reading out and executing the printer app 312. When the print app execution unit 303 receives print data of a predetermined format (for example, Extensible Mark-up Language (XML) format) transmitted from the browser execution unit 302, the print app execution unit 303 converts the received print data to a control command of the command system corresponding to the printer 2. The control command includes character codes, commands for printing character codes, or the like based on the print data. In addition, the print app execution unit 303 transmits and receives the URL scheme information to and from the browser app 311.

Here, the URL scheme refers to a type of function of transmitting and receiving information (including data, commands, and the like) between an application program and another application program different from the application program.

The URL scheme is described in, for example, a format shown as "(application name)://(action)?(parameter)(&)...". "://" (mark, symbol, sign) is a delimiter separating the scheme. Before the "://" is a portion in which the application name which is the name of the application program is described and after the "://" is a command portion in which a command relating to the application program of the application name described in the previous portion is described.

In "(application name)", for example, identification information (for example, ID, name, and the like) for identifying the application program which is the transmission destination to which the information is transmitted is described, as the application name. For example, in a case of transmitting data from the browser app 311 to the printer app 312, the browser app 311 describes identification information for identifying the printer app 312 in the above format "(application name)".

"(Action)" describes the identification name of the process to be executed by the application program specified before "://". For example, in a case where a printing process is executed, the identification name of the printing process such as "Print" is described in "(action)". The description of "(action)" is omitted depending on the URL scheme information.

"(Parameter)" is a parameter given to an application program specified before "://", and a parameter item and a parameter value are described in association with each other. In a case of describing a plurality of "(parameters)", a linking symbol indicating "&" is used. In particular, in a case where "(action)" is described in the USL scheme information, "(parameter)" is a parameter given to the application program specified before "://" in the process described in "action".

For example, when transmitting the print data from the browser app 311 to the printer app 312, the browser app 311 transmits the following URL scheme information to the printer app. That is, the browser app 311 transmits URL scheme information of "(identification information for printer app)://(identification name indicating printing process)?(parameter item indicating item of print data type=parameter value indicating type)&(parameter item indicating item of print data=parameter value indicating print data)" to the printer app 312.

In this manner, the browser execution unit 302 and the print app execution unit 303 transmit and receive the URL scheme information. That is, the browser app 311 and the printer app 312 transmit and receive the URL scheme information.

Meanwhile, it is known that screen shifts are generated when URL scheme information is transmitted and received between an application program and another application program different from the application program. In the present embodiment, the screen shifts indicate a change from a certain display screen state to another display screen state.

FIG. 4 is a diagram for illustrating screen shifts.

FIG. 4 illustrates an example of a case where the transmission and reception of URL scheme information is performed between the browser app 311 and the printer app 312.

As shown in FIG. 4, the touch panel 34 of the tablet terminal 3 displays a browser app screen 311G (upper level program screen) showing the screen of the browser app 311 in the foreground and displays a printer app screen 312G showing the screen of the printer app 312 in the background. Display in the foreground means to display the screen of the application program for which the operation is in an active state at the forefront in a situation where the screens of a plurality of application programs are displayed. Display in the background means to display while overlapped or hidden by the screen displayed in the foreground in a situation where the screens of a plurality of application programs are displayed.

Here, when the URL scheme information is transmitted from the browser app 311 to the printer app 312, the printer app 312 which received the URL scheme information enters an active state. Along with this, as shown in FIG. 4, a screen shift is generated on a display screen 340 of the touch panel 34. That is, the touch panel 34 displays the printer app screen 312G in the foreground and generates a screen shift for displaying the browser app screen 311G in the background. In addition, when the URL scheme information is transmitted from the printer app 312 to the browser app 311, the browser app 311 which received the URL scheme information enters an active state. Along with this, as shown in FIG. 4, a screen shift is generated in which the browser app screen 311G is displayed in the foreground and the printer app screen 312G is displayed in the background on the display screen 340 of the touch panel 34.

The printer app 312 is an application program which is executed by the terminal processor 30 to cause the terminal processor 30 to function as the print app execution unit 303. Accordingly, the printer app 312 is an application program for realizing the function of relaying the terminal processor 30 between the browser execution unit 302 and the printer 2. Therefore, the browser app 311 is an application program which is the main program for controlling the printer 2, and is an upper level application program with respect to the printer app 312. When executing printing, the print data is delivered from the browser app 311 to the printer app 312 as URL scheme information, the printer app 312 converts the print data into a control command and transmits the control command to the printer 2. Here, when a communication error is generated between the tablet terminal 3 and the printer 2, the printer app 312 may notify the upper level browser app 311, may receive an instruction from the browser app 311 along with the notification, and the number of exchanges with the browser app 311 may increase. In the present embodiment, a communication error indicates that communication and connection is not possible with the printer 2 and, as a result, there is a concern that the period during which a communication error with the printer 2 is generated may be prolonged. In addition, along with an increase in exchanges with the upper level browser app 311, a large number of screen shifts switching between the display in the foreground and display in the background between the browser app screen 311G and the printer app screen 312G are generated on the display screen 340 of the touch panel 34 and there is a possibility that the user may feel discomfort.

Therefore, the printer app 312 of the present embodiment causes the terminal processor 30 to function as follows.

Figure 5A:
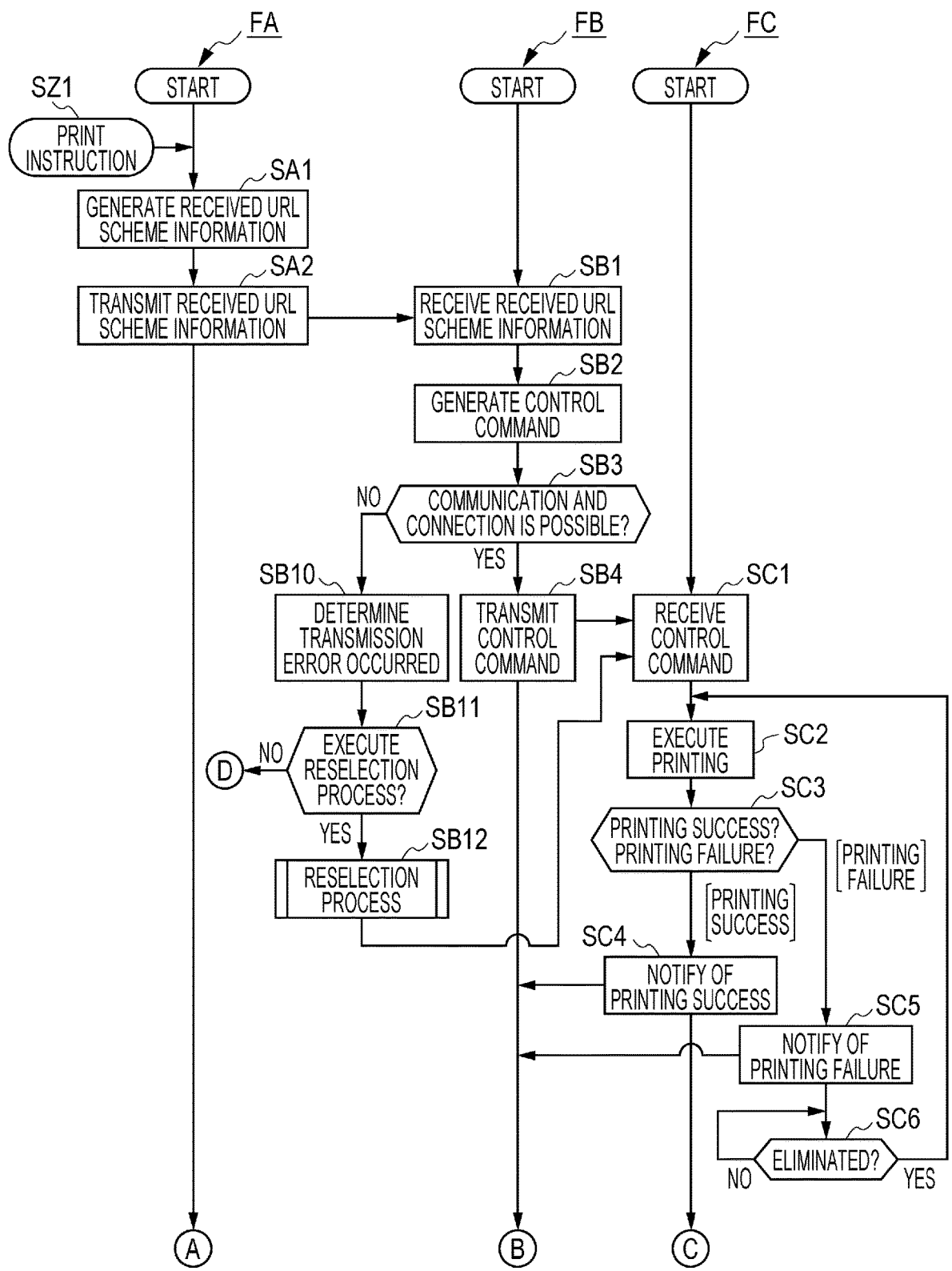
FIGS. 5A and 5B are a flowchart showing operations of a tablet terminal and a printer.
Figure 5B:
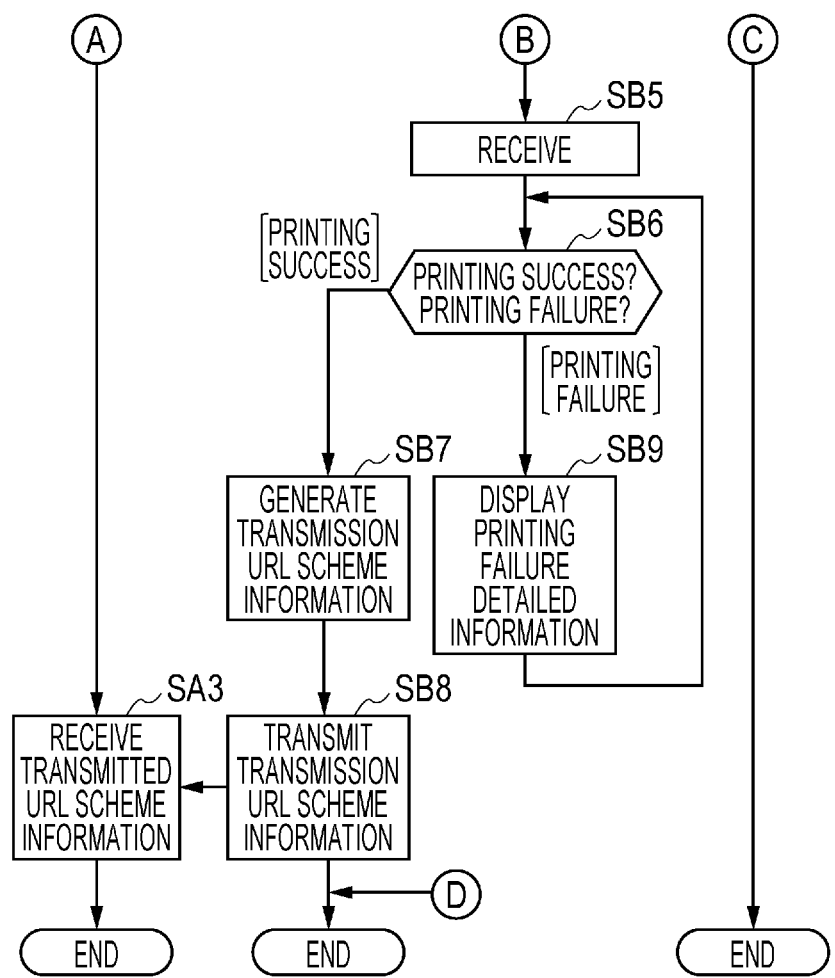

FIGS. 5A and 5B are a flowchart showing operations of the tablet terminal 3 and the printer 2, in particular, a flowchart showing operations of the browser execution unit 302, the print app execution unit 303, and the printer 2. In FIGS. 5A and 5B, the flowchart FA shows the operations of the browser execution unit 302, the flowchart FB shows the operations of the print app execution unit 303, and the flowchart FC shows the operations of the printer 2.

Below, the URL scheme information to be received by the printer app 312 is expressed as received URL scheme information (first information) and the URL scheme information to be transmitted by the printer app 312 is expressed as transmitted URL scheme information. The transmission and reception of the URL scheme information between the browser execution unit 302 and the print app execution unit 303 corresponds to the transmission and reception of the URL scheme information between the browser app 311 and the printer app 312.

At the start point of each flowchart shown in FIG. 5A and FIG. 5B, the browser app screen 311G is displayed in the foreground and the printer app screen 312G is displayed in the background.

The browser execution unit 302 monitors the user's operations on the web page shown by the browser app screen 311G displayed in the foreground on the touch panel 34. As shown in the flowchart FA of FIG. 5A and FIG. 5B, when a print instruction is input from the user (step SZ1), the browser execution unit 302 generates received URL scheme information for the printer 2 to execute printing based on the print data (step SA1). For example, the browser execution unit 302 generates the following received URL scheme information.

Received URL scheme information: "(identification information of printer app 312)://(identification name indicating printing process)?(parameter item indicating type of print data item=parameter value indicating type)&(parameter item indicating item of print data=parameter value indicating print data)&(parameter item indicating item of printing destination=parameter value indicating identification information of the printer 2)&(parameter item indicating item of reselection process=parameter value indicating validity)".

"(parameter item indicating item of print data=parameter value indicating print data)" is a parameter related to print data in the URL scheme information. The parameter value indicating the print data included in this parameter corresponds to the printing information of the invention.

"(parameter item indicating item of printing destination=parameter value indicating identification information of printer 2)" is a parameter related to the printing destination in the URL scheme information and corresponds to the printing destination information of the invention. The parameter value included in this parameter is identification information for identifying the printer 2 which executes printing based on the print data, and is an IP address, a MAC address, a serial number uniquely assigned at the time of manufacturing, or the like. In this parameter, identification information of the printer 2 which communicated with the tablet terminal 3 in the past, identification information of the printer 2 associated with the tablet terminal 3, and the like are selectively or uniquely described.

"(parameter item indicating item of reselection process=parameter value indicating validity)" is a parameter related to the execution of the reselection process in the URL scheme information and corresponds to the reselection process information of the invention.

As described in detail below, the reselection process is a process in a case where a communication error with the printer 2 indicated by the parameter relating to the printing destination is generated, and is a process for reselecting the printer 2 to execute printing.

When the browser execution unit 302 generates the received URL scheme information, the browser execution unit 302 transmits the received URL scheme information to the print app execution unit 303 (step SA2).

Next, as shown in the flowchart FB of FIG. 5A and FIG. 5B, the print app execution unit 303 receives the received URL scheme information from the browser execution unit 302 (step SB1). The print app execution unit 303 receiving the received URL scheme information from the browser execution unit 302 corresponds to the printer app 312 receiving the received URL scheme information from the browser app 311. In addition, receiving the received URL scheme information corresponds to acquiring the received URL scheme information.

When the print app execution unit 303 receives the URL scheme information from the browser execution unit 302, a screen shift is generated for displaying the browser app screen 311G in the background and displaying the printer app screen 312G in the foreground on the display screen 340 of the touch panel 34.

Figure 6:
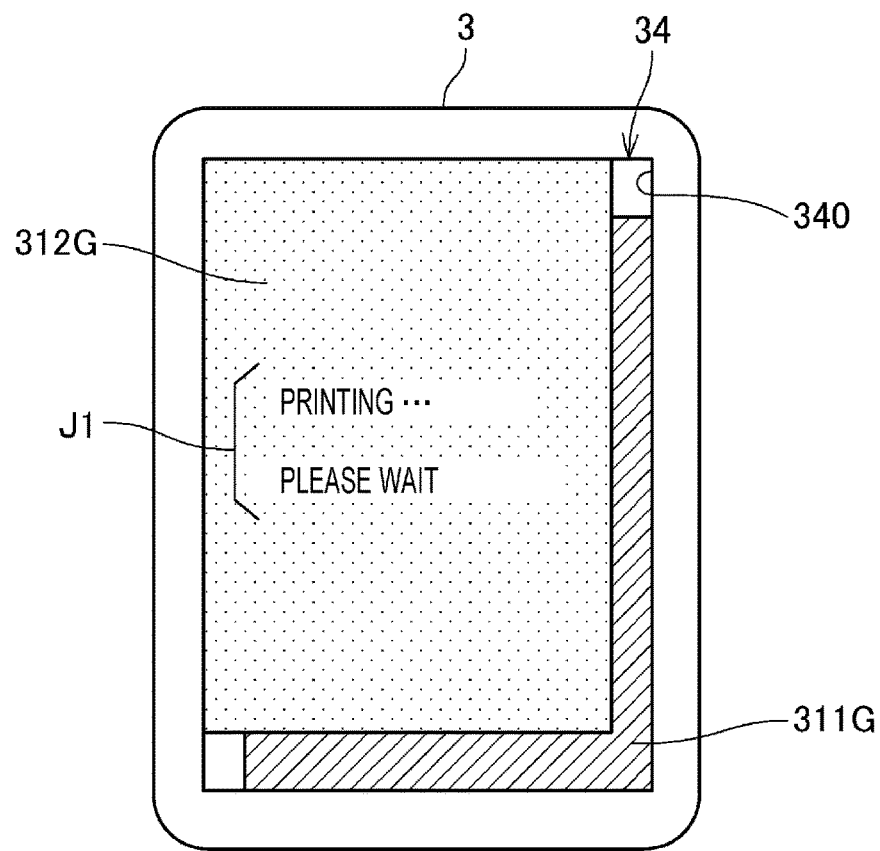
FIG. 6 is a diagram showing an example of a display mode of a display screen of a touch panel.

FIG. 6 is a diagram showing an example of a display mode of the display screen 340 of the touch panel 34.

FIG. 6 shows a display mode of the display screen 340 of the touch panel 34 in a case where the print app execution unit 303 receives the URL scheme information from the browser execution unit 302.

As shown in FIG. 6, the display screen 340 of the touch panel 34 displays the printer app screen 312G in the foreground and displays the browser app screen 311G in the background. The printer app screen 312G displayed in the foreground displays information J1 indicating printing is being executed.

Returning to the explanation of the flowchart FB in FIG. 5A and FIG. 5B, when the print app execution unit 303 receives the received URL scheme information, the print app execution unit 303 generates a control command of a command system compatible with (interpretable and executable by) the printer 2 based on the received URL scheme information (step SB2). This control command includes character codes, commands for printing character codes, or the like based on the print data included in the received URL scheme information.

For example, the print app execution unit 303 receives the received URL scheme information: "(identification information of the printer app 312)://(identification name indicating printing process)?(parameter item indicating item of print data type=parameter value indicating type)&(parameter item indicating item of print data=parameter value indicating print data)". In such a case, the print app execution unit 303 generates a control command including a command to execute printing based on the print data indicated by the parameter value.

Next, the print app execution unit 303 determines whether or not communication and connection is possible with the printer 2 indicated by the parameter related to the printing destination included in the received URL scheme information (step SB3). It is possible to adopt any determination method as the method of determining whether or not a communication and connection is possible.

In a case of determining that communication and connection is possible with the printer 2 indicated by the parameter relating to the printing destination included in the received URL scheme information (step SB3: YES), the print app execution unit 303 executes the process of step SB4. That is, the print app execution unit 303 transmits the control command generated in step SB2 to the printer 2 through the terminal short-range wireless communication unit 33 (step SB4).

As shown in flowchart FC of FIG. 5A and FIG. 5B, the communication control unit 202 of the printing device control unit 200 of the printer 2 receives the control command from the printing device short-range wireless communication unit 23 (step SC1). Next, the printing control unit 201 of the printing device control unit 200 executes printing using the printing unit 26 based on the control command (step SC2).

Next, the printing control unit 201 determines whether printing based on the control command received by the printing unit 26 succeeded or failed (step SC3). For example, in a case of acquiring information indicating being out of roll paper during printing, the printing control unit 201 determines that the printing failed (step SC3: "printing failure"). In addition, for example, in a case where the cover which covers the accommodating portion which accommodates the roll paper at the time of printing is in the open state, the printing control unit 201 determines that the printing failed (step SC3: "printing failure"). In addition, for example, in a case where the error described above is not generated during printing, the printing control unit 201 determines that the printing is successful (step SC3: "printing success").

In a case where the printing control unit 201 determines that the printing is successful (step SC3: "printing success"), the communication control unit 202 notifies the tablet terminal 3 of the printing success (step SC4). That is, the communication control unit 202 transmits information indicating the printing success to the tablet terminal 3 by the printing device short-range wireless communication unit 23.

As shown in a flowchart FB of FIG. 5A and FIG. 5B, the print app execution unit 303 receives information indicating the printing success through the terminal short-range wireless communication unit (step SB5). Next, based on the information received in step SB5, the print app execution unit 303 determines whether the printer 2 succeeded or failed in printing (step SB6). In a case of receiving information indicating printing success in step SB5, the print app execution unit 303 determines that the printer 2 is successful in printing (step SB6: "printing success"). On the other hand, in a case of receiving information indicating printing failure in step SB5, the print app execution unit 303 determines that the printer 2 failed in printing (step SB6: "printing failure").

When it is determined that the printer 2 is successful in printing (step SB6: "printing success"), the printing application execution unit 303 generates transmitted URL scheme information indicating printing success (step SB7). For example, the print app execution unit 303 generates the transmitted URL scheme information shown below.

Transmitted URL scheme information: "(identification information of the browser app 311)://?(parameter item indicating item of print result=parameter value indicating printing success)".

The print app execution unit 303 transmits the generated transmitted URL scheme information to the browser execution unit 302 (step SB8). The transmission of the URL scheme information indicating the printing success corresponds to notification of the printing success. In addition, in the present embodiment, in a case where the communication between the printer 2 and the tablet terminal 3 is successful, it is possible to provide notification of the printing success, and providing notification of the printing success is equivalent to providing notification of the communication success.

As shown in the flowchart FA of FIG. 5A and FIG. 5B, the browser execution unit 302 receives the transmitted URL scheme information from the print app execution unit 303 (step SA3).

When the browser execution unit 302 receives the transmitted URL scheme information from the print app execution unit 303, a screen shift is generated for displaying the browser app screen 311G in the foreground and displaying the printer app screen 312G in the background on the display screen 340 of the touch panel 34. That is, the display screen 340 shown in FIG. 6 shifts to the display screen 340 shown in FIG. 7 on the display screen 340 of the touch panel 34.

Figure 7:
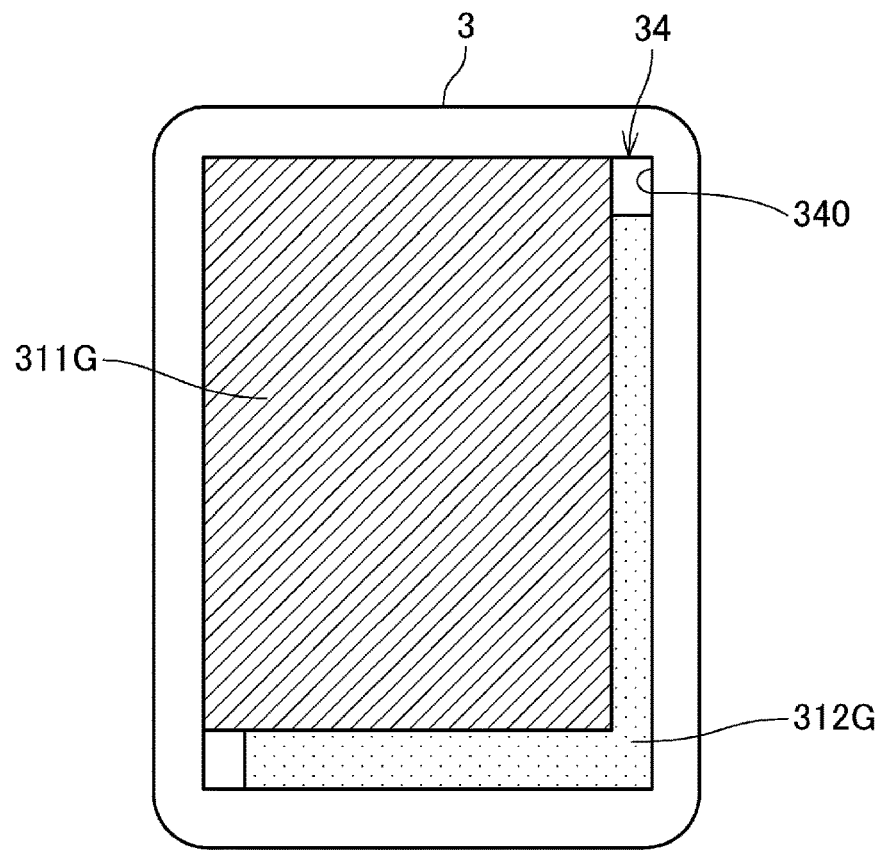
FIG. 7 is a diagram showing an example of a display mode of a display screen of a touch panel.

FIG. 7 is a diagram showing an example of a display mode of the display screen 340 of the touch panel 34.

FIG. 7 shows a display mode of the display screen 340 of the touch panel 34 in a case where the browser execution unit 302 receives the transmitted URL scheme information from the print app execution unit 303.

As shown in FIG. 7, the display screen 340 of the touch panel 34 displays the browser app screen 311G in the foreground and displays the printer app screen 312G in the background. In FIG. 7, screens which do not display information such as texts and images are exemplified as the browser app screen 311G and the printer app screen 312G, but information indicating the printing success may be displayed. Due to this, it is possible to present not only the screen shift but also the printing success to the user as information, making it possible for the user to more reliably recognize that the printing is successful.

Returning to the description of step SC3 of the flowchart FC in FIG. 5A and FIG. 5B, in a case where the printing control unit 201 determines the printing has failed (step SC3: "printing failure"), the communication control unit 202 notifies the tablet terminal 3 of the printing failure (step SC5). That is, the communication control unit 202 transmits information indicating printing failure to the tablet terminal 3 using the printing device short-range wireless communication unit 23 (step SC5). When transmitting information indicating printing failure to the tablet terminal 3, the communication control unit 202 also transmits information indicating a factor behind the printing failure. For example, in a case where the factor behind the printing failure is being out of roll paper, the communication control unit 202 transmits information indicating being out of roll paper together with information indicating printing failure.

When the process of step SC5 is executed, the printing control unit 201 of the printer 2 determines whether or not the cause of the printing failure was eliminated (step SC6) and, in a case where it is determined that the cause of the printing failure was eliminated (step SC6: YES), the process returns to step SC2 to execute printing again.

As shown in the flowchart FB of FIG. 5A and FIG. 5B, the print app execution unit 303 receives information indicating printing failure through the terminal short-range wireless communication unit (step SB5), and determines that the printer 2 failed in printing (step SB6: "printing failure").

When receiving the information indicating printing failure, the print app execution unit 303 does not notify the browser app 311 of the printing failure and displays printing failure detailed information ISJ (refer to FIG. 8) on the printer app screen 312G displayed in the foreground (step SB9).

Figure 8:
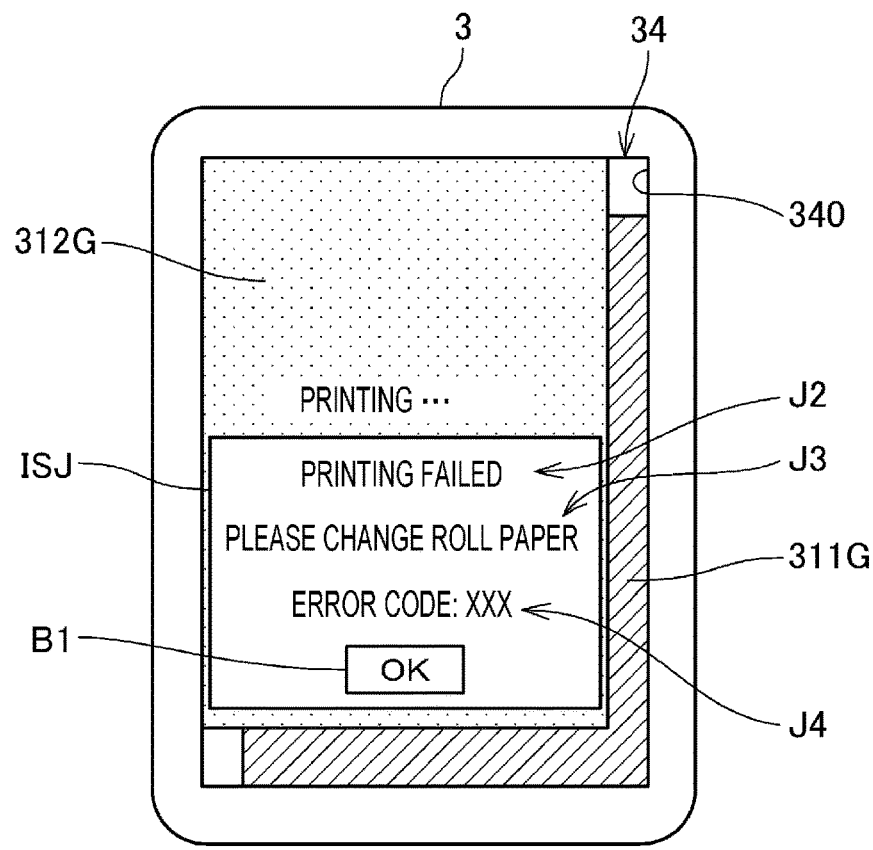
FIG. 8 is a diagram showing an example of a display mode of a display screen of a touch panel.

FIG. 8 is a diagram showing an example of a display mode of the display screen 340 of the touch panel 34.

As shown in FIG. 8, the display screen 340 of the touch panel 34 displays the printer app screen 312G in the foreground and displays the browser app screen 311G in the background. In addition, as shown in FIG. 8, the display screen 340 of the touch panel 34 displays the printing failure detailed information ISJ on the printer app screen 312G displayed in the foreground.

The printing failure detailed information ISJ includes information J2 indicating the printer 2 failed in printing, information J3 indicating measures with respect to a factor behind printing failure, and information J4 indicating a code of the factor behind the printing failure (that is, error). When displaying the printing failure detailed information ISJ on the printer app screen 312G, the print app execution unit 303 acquires information J3 indicating measures and information J4 indicating the code of the factor behind the printing failure by a predetermined method based on the information indicating the cause of the printing failure received from the printer 2.

In this manner, the print app execution unit 303 does not notify the browser execution unit 302 that the printer 2 failed in the printing, and displays the printing failure detailed information ISJ on the printer app screen 312G. Due to this, no screen shift is generated for switching the display of the foreground and the display of the background for the printer app screen 312G and the browser app screen 311G on the display screen 340 of the touch panel 34. Accordingly, it is possible for the print app execution unit 303 to present to the user that the printer 2 failed in printing, while suppressing a feeling of discomfort due to the screen shift from being imparted to the user.

In addition, a button B1 is superimposed on the printing failure detailed information ISJ and displayed on the printer app screen 312G. The button B1 is a button for canceling the display of the printing failure detailed information ISJ. When the button B1 is selected, the display of the printing failure detailed information ISJ on the printer app screen 312G is canceled. That is, the display screen 340 of the touch panel 34 shown in FIG. 8 shifts to the display screen 340 of the touch panel 34 shown in FIG. 6. At this time, the print app execution unit 303 returns to the process from step SB9 to step SB6, and determines again whether the printer 2 succeeded or failed in printing.

Returning to the description of step SB3 of the flowchart FB of FIG. 5A and FIG. 5B, in a case where the print app execution unit 303 determines that communication and connection is not possible with the printer 2 indicated by the parameter relating to the printing destination included in the received URL scheme information (step SB3: NO), it is determined that a communication error with the printer 2 was generated (step SB10).

Next, the print app execution unit 303 determines whether or not to execute the reselection process (step SB11). In step SB11, the printing application execution unit 303 displays reselection process execution/non-execution information SUJ on the printer app screen 312G.

Figure 9:
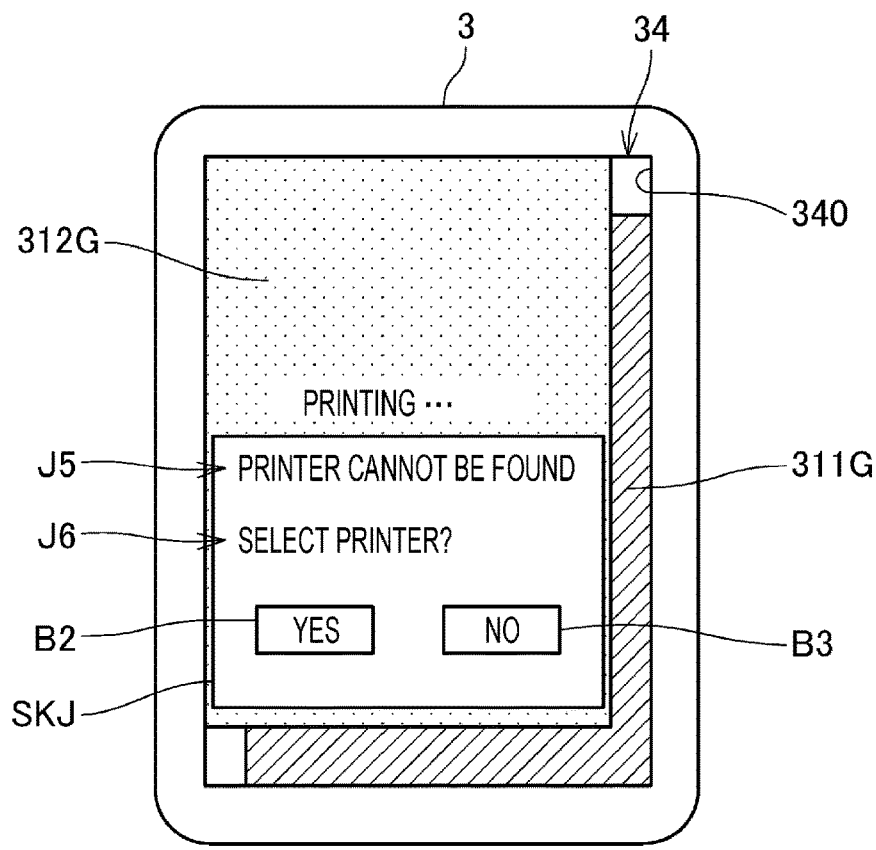
FIG. 9 is a diagram showing an example of a display mode of a display screen of a touch panel.

FIG. 9 is a diagram showing an example of a display mode of the display screen 340 of the touch panel 34.

As shown in FIG. 9, the display screen 340 of the touch panel 34 displays the printer app screen 312G in the foreground and displays the browser app screen 311G in the background. In addition, as shown in FIG. 9, the display screen 340 of the touch panel 34 displays reselection process execution/non-execution information SUJ on the printer app screen 312G displayed in the foreground.

The reselection process execution/non-execution information SUJ includes information J5 indicating communication and connection is not possible with the printer 2 indicated by the parameter relating to the printing destination included in the received URL scheme information, and information J6 indicating whether or not to execute the reselection process.

In this manner, the print app execution unit 303 does not notify the browser execution unit 302 that the communication and connection is not possible with the printer 2 indicated by the parameter related to the printing destination included in the received URL scheme information, and displays the reselection process execution/non-execution information SUJ on the printer app screen 312G. Due to this, no screen shift is generated for switching the foreground display and background display for the printer app screen 312G and the browser app screen 311G on the display screen 340 of the touch panel 34. Accordingly, it is possible to suppress a feeling of discomfort due to the screen shift from being imparted to the user, and it is possible for the print app execution unit 303 to present the user with the fact that communication and connection is not possible with the printer 2 indicated by the parameter relating to the printing destination included in the received URL scheme information (that is, that a communication error was generated).

In addition, the reselection process execution/non-execution information SUJ is displayed on the printer app screen 312G overlapped with a button B2 and a button B3. The button B2 is a button for instructing the execution of the reselection process. The button B3 is a button for instructing not to execute the reselection process. For example, in a case where the button B2 is selected, the print app execution unit 303 determines that the reselection process is to be executed (step SB11: YES), and in a case where the button B3 is selected, the print app execution unit 303 determines that the reselection process is not to be executed (step SB11: NO).

Returning to the description of the flowchart FB in FIG. 5A and FIG. 5B, in a case of determining that the reselection process is not to be executed (step SB11: NO), the print app execution unit 303 ends the present process. At this time, for example, the print app execution unit 303 may display information (serial number, printer name, MAC address, or the like) related to the printer 2 indicated by the parameter relating to the printing destination included in the received URL scheme information on the printer app screen 312G. In addition, for example, the display screen 340 of the touch panel 34 may carry out a screen shift from the display screen 340 shown in FIG. 9 to the display screen 340 shown in FIG. 7.

On the other hand, in a case where it is determined that the reselection process is to be executed (step SB11: YES), the print app execution unit 303 executes the reselection process (step SB12). Here, a detailed description will be given of the reselection process. The reselection process is a process of selecting the printer 2 other than the printer 2 indicated by the parameter relating to the printing destination included in the received URL scheme information, as the target of the printing destination.

Figure 10:
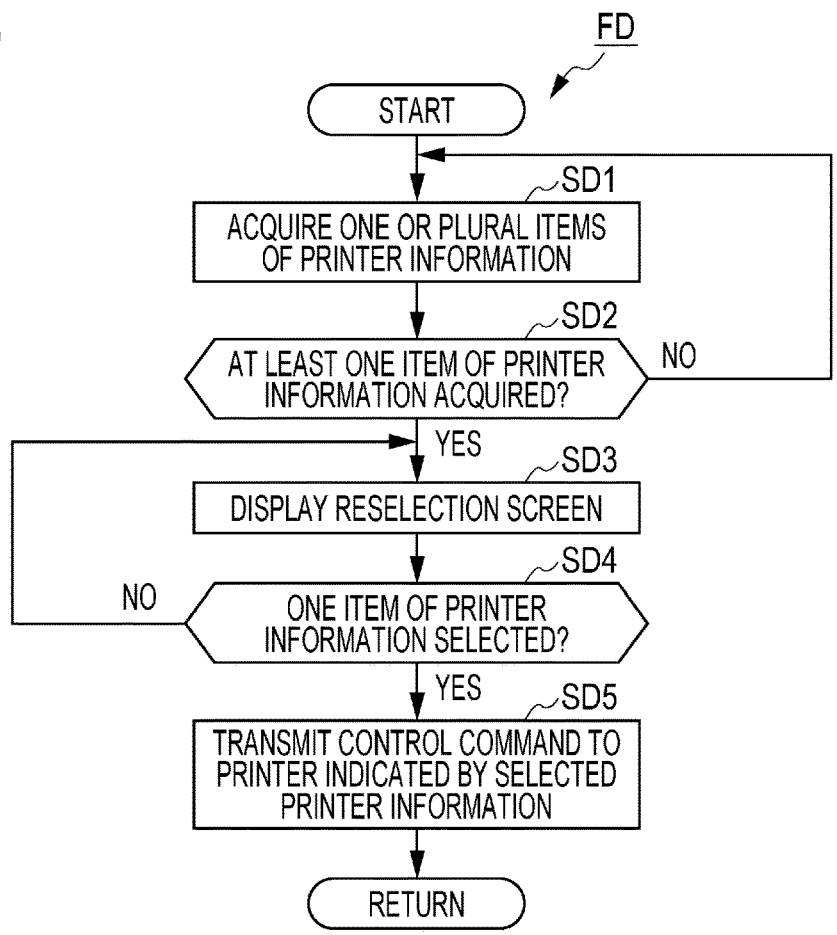
FIG. 10 is a flowchart showing operations of a print app execution unit (processor).

FIG. 10 is a flowchart FD showing operations of the print app execution unit 303 in the reselection process.

The print app execution unit 303 acquires printer information indicating the printer 2 able to communicate with the tablet terminal 3 (step SD1). Here, a description will be given of the acquisition of printer information.

In the present embodiment, short-range wireless communication is exemplified as the communication between the tablet terminal 3 and the printer 2, but in this example, the tablet terminal 3 and one or a plurality of the printers 2 are connected to a predetermined network. The printer 2 connected to this network is not the printer 2 indicated by the parameter relating to the printing destination included in the received URL scheme information. In step SD1, the print app execution unit 303 broadcasts a command of a predetermined command system on the network. This command is, for example, a command requesting the transmission of printer information. The printer 2 capable of interpreting this command transmits the printer information to the tablet terminal 3 via the network. Due to this, the print app execution unit 303 acquires the printer information of the printer 2 capable of communication and connection.

In addition, for example, the print app execution unit 303 acquires printer information from the operating system 301. In a case where the communication standard of the short-range wireless communication of the terminal short-range wireless communication unit 33 is Bluetooth, the operating system 301 acquires the information acquired at the time of pairing from the printer 2 paired at a distance at which pairing is maintained, as printer information. Then, the print app execution unit 303 acquires the printer information acquired by the operating system 301. In a case where the operating system 301 is iOS (registered trademark), the print app execution unit 303 acquires information about printers, which were previously communicated with and connected to, from the operating system 301. In addition, in a case where the operating system 301 is Android (registered trademark), the print app execution unit 303 acquires the printer information for all the paired printers 2 from the operating system 301. Due to this, the print app execution unit 303 acquires the printer information for the printers 2 capable of communication and connection.

As described above, since the print app execution unit 303 acquires printer information by broadcasting a command or from the operating system 301, it is possible to acquire printer information indicating the printers 2 which are able to reliably carry out communication and connection. Therefore, it is possible for the print app execution unit 303 to prevent the reselection process described below from being executed a plurality of times and to further shorten the period during which communication errors are generated between the tablet terminal 3 and the printer 2.

Next, the print app execution unit 303 determines whether or not at least one item of printer information is acquired (step SD2). In a case where the print app execution unit 303 determines that one item of printer information is not acquired (step SD2: NO), the process returns to step SD1. On the other hand, in a case where it is determined that at least one item of printer information is acquired (step SD2: YES), the printing application execution unit 303 displays a reselection screen SSG for displaying one or a plurality of items of printer information acquired in step SD1 on the printer app screen 312G (step SD3).

Figure 11:
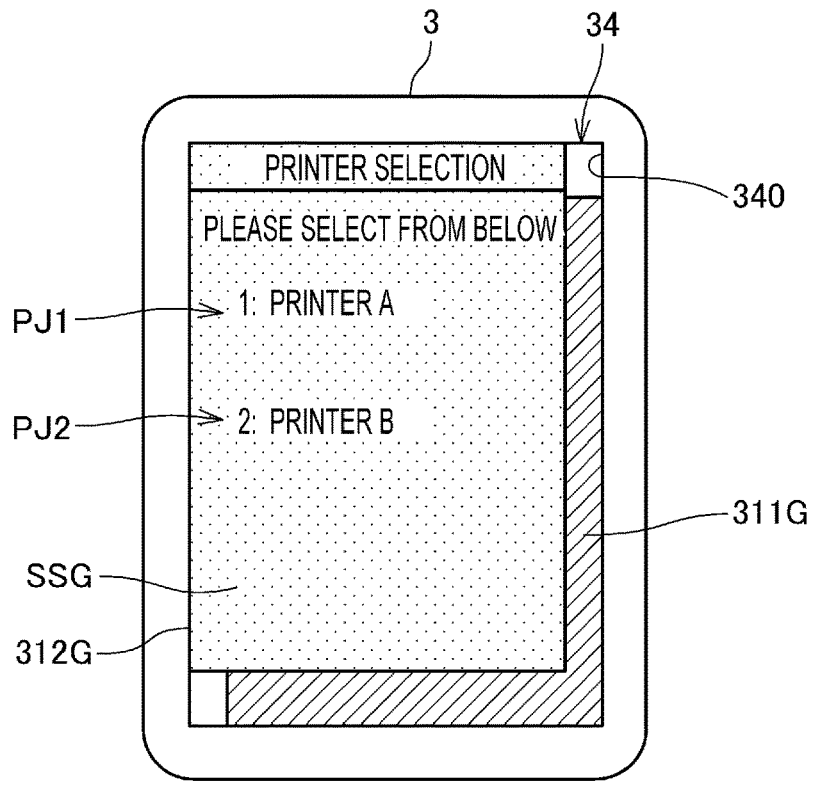
FIG. 11 is a diagram showing an example of a display mode of a display screen of a touch panel.

FIG. 11 is a diagram showing an example of a display mode of the display screen 340 of the touch panel 34.

As shown in FIG. 11, the display screen 340 of the touch panel 34 displays the printer app screen 312G in the foreground and displays the browser app screen 311G in the background. In addition, as shown in FIG. 11, the display screen 340 of the touch panel 34 displays the reselection screen SSG on the printer app screen 312G displayed in the foreground.

The reselection screen SSG is a screen for the reselection process. In the reselection screen SSG, the printer information acquired in step SD1 is displayed in a selectable manner. In FIG. 11, printer information indicating "printer A" and printer information indicating "printer B" are displayed on the reselection screen SSG. This display indicates that the printer information of the two printers 2 was acquired in step SD2.

In this manner, in a case where a communication error with the printer 2 is generated indicated by the parameter relating to the printing destination included in the received URL scheme information, the print app execution unit 303 does not notify the browser execution unit 302 that a communication error was generated and displays the reselection screen SSG on the printer app screen 312G. Due to this, no screen shift is generated for switching the foreground display and background display for the printer app screen 312G and the browser app screen 311G on the display screen 340 of the touch panel 34. Accordingly, it is possible for the print app execution unit 303 to present the user with printer information indicating the printer 2 which is capable of reliable communication and connection, while suppressing a feeling of discomfort due to the screen shift from being imparted to the user.

Returning to the description of the flowchart FD shown in FIG. 10, when the print app execution unit 303 displays the reselection screen SSG on the printer app screen 312G, it is determined whether or not one item of printer information is selected on the reselection screen SSG (step SD4). In a case where it is determined that one item of printer information is not selected on the reselection screen SSG (step SD4: NO), the printing application execution unit 303 continues the process of step SD3.

On the other hand, in a case where it is determined that one item of printer information was selected on the reselection screen SSG (step SD4: YES), the printing application execution unit 303 transmits the control command generated in step SB2 to one selected printer 2 (step SD5). At this time, the display screen 340 of the touch panel 34 shifts from the display screen 340 shown in FIG. 11 to the display screen 340 shown in FIG. 6.

In this manner, the print app execution unit 303 prepares to transmit the control command to the printer 2 indicated by the parameter related to the printing destination included in the received URL scheme information by generating the control command in step SB2. Since this control command is a command based on the print data included in the received URL scheme information, this control command corresponds to the printing information in the present embodiment. Then, in a case where a communication error with the printer 2 indicated by the parameter relating to the printing destination included in the received URL scheme information is generated, the print app execution unit 303 changes the printing destination to the printer 2 selected in the reselection process and transmits the control command. Due to this, it is possible for the print app execution unit 303 to promptly transmit the control command to the printer 2 selected in the reselection process information, and to promptly cause the printer 2 to execute the printing based on the control command.

The printer 2 selected in the reselection process executes printing based on the received control command and executes a process corresponding to a case where the printing succeeds or to a case where the printing fails. Then, as described above, the print app execution unit 303 executes the process corresponding to a case where the printer 2 selected in the reselection process succeeds in the printing or to a case where the printer 2 fails in the printing. In addition, in a case where the printer 2 selected in the reselection process succeeds in printing, the browser execution unit 302 receives the transmitted URL scheme information from the print app execution unit 303. At this time, as shown in FIG. 7, a screen shift is generated in which the browser app screen 311G is displayed in the foreground and the printer app screen 312G is displayed in the background on the display screen 340 of the touch panel 34.

In this manner, the terminal processor 30 executes the printer app 312 to cause the terminal processor 30 to function as the print app execution unit 303. That is, the print app execution unit 303 acquires the received URL scheme information in which the process (that is, reselection process) in a case where a communication error with the printer 2 is generated is specified from the browser app 311 and executes the reselection process of the printer 2 in a case where a communication error with the printer 2 specified by the received URL scheme information is generated. Due to this, the print app execution unit 303 executes the reselection process in a case where a communication error is generated, thus, there is no exchange with the browser execution unit 302 and communication is possible with the printer 2 other than the printer 2 specified by the received URL scheme information. Accordingly, it is possible for the print app execution unit 303 to shorten the period during which a communication error with the printer 2 is generated. In addition, since it is possible to reduce the number of screen shifts of the display screen 340 of the touch panel 34, it is possible for the printing application execution unit 303 to suppress a feeling of discomfort due to the screen shift from being imparted to the user.

In addition, in a case where a communication error with the printer 2 specified in the received URL scheme information is generated, the print app execution unit 303 does not notify the browser app 311 of the generation of a communication error. In a case where the reselection process is executed such that the communication with the printer 2 is successful, the print app execution unit 303 notifies the browser app 311 of the communication success. Due to this, the print app execution unit 303 notifies the browser app 311 of the communication success only in a case where the communication with the printer 2 is successful, thus, it is possible to reduce exchanges with the browser app 311 to the minimum necessary and to further shorten the period during which communication errors are generated with the printer 2. Furthermore, it is possible for the print app execution unit 303 to reduce the screen shifts in which the printer app screen 312G and the browser app screen 311G are switched to the minimum necessary. Therefore, it is possible to suppress a feeling of discomfort due to the screen shift from being imparted to the user. In addition, the print app execution unit 303 providing notification of the successful communication corresponds to the print app execution unit 303 providing notification of the printing success. Therefore, it is possible to reduce the number of screen shifts which are generated before the printing by the printer 2 is successful to the minimum necessary.

In addition, the printing application execution unit 303 provides notification of the printing success by transmitting the transmitted URL scheme information to the browser app 311. As a result, the print app execution unit 303 causes a shift from the reselection screen SSG to the browser app screen 311G. Here, the shift means displaying the browser app screen 311G, which was displayed in the background, in the foreground. Due to this, it is possible for the print app execution unit 303 to easily allow the user to recognize that the communication with the printer 2 is successful, while suppressing a feeling of discomfort due to the screen shift from being imparted to the user. In addition, it is possible for the user to easily recognize that the printer 2 is successful in printing.

As described above, the printer app 312 (printer program) is an application program executed by the terminal processor 30 (processor) of the tablet terminal 3 (terminal) connectable to the printer 2, and is stored in a non-transitory processor readable medium such as the terminal storage unit 310. The printer app 312 reads out and executes the printer app 312 from the terminal storage unit 310 in the terminal processor 30 so as to acquire receiving URL scheme information (first information) specified by the process in a case where a communication error with the printer 2 is generated from the browser app 311 (upper level program) operating in the upper level layer of the printer app 312, and executes a reselection process of the printer 2 based on the received URL Scheme information in a case where a communication error with the printer 2 is generated.

According to this configuration, the printer app 312 is executed by the terminal processor 30, and, in a case where a communication error with the printer 2 is generated, it is possible to reduce the exchanges with the browser app 311 by executing the reselection process of the printer 2 based on the received URL scheme information, thus, it is possible to shorten the period during which communication errors with the printer 2 are generated.

In addition, the printer app 312 is executed by the terminal processor 30, and the browser app 311 is not notified of the generation of a communication error in a case where a communication error with the printer 2 is generated, but the browser app 311 is notified of the communication success in a case where the reselection process is executed such that communication with the printer 2 is successful.

According to this configuration, it is possible to reduce the exchanges with the browser app 311 to the minimum necessary, and it is possible to shorten the period during which a communication error with the printer 2 is generated.

In addition, the tablet terminal 3 is provided with the touch panel 34 (display unit). The printer app 312 is executed by the terminal processor 30 and causes the touch panel 34 to display the reselection screen SSG, which is the reselection process screen, in a case where a communication error with the printer 2 is generated and causes the display on the touch panel 34 to shift from the reselection screen SSG to the browser app screen 311G (upper level program screen) in a case where the reselection process is executed such that the communication with the printer 2 is successful.

According to this configuration, since the reselection screen SSG is displayed in a case where a communication error with the printer 2 is generated, and the reselection screen SSG shifts to the browser app screen 311G in a case where the reselection process is executed such that the communication with the printer 2 is successful, it is possible to reduce the number of screen shifts to the minimum necessary. Accordingly, it is possible for the printer app 312 to suppress a feeling of discomfort due to the screen shift from being imparted to the user. In addition, since the screen shift is generated in a case where the communication is successful, it is possible for the printer app 312 to easily allow the user to recognize that the communication with the printer is successful.

In addition, the received URL scheme information includes parameters (printing destination information) relating to the printing destination which specifies the printer 2 which is the printing destination, print data (printing information), and parameters related to the reselection process (reselection process information). The printer app 312 is executed by the terminal processor 30 and causes the terminal processor 30 to prepare to transmit a control command (printing information) based on the print data to the printer 2 specified by the parameter relating to the printing destination, and, in a case where a communication error with the printer 2 is generated, the reselection process is executed based on the reselection process information, the printer 2 which is the printing destination changes to the printer 2 selected in the reselection process, and the control command is transmitted.

According to this configuration, in a case where a communication error with the printer 2 specified by the parameter relating to the printing destination is generated, since the printing destination is changed to the printer 2 selected in the reselection process and the control command is transmitted, it is possible to promptly execute the printing based on the control command by the printer 2 selected in the reselection process information.

In addition, the reselection screen SSG displays printer information in a selectable manner. The printer information includes information acquired by broadcasting a command or information acquired from the operating system 301.

According to this configuration, since the reselection screen displays the information acquired by broadcasting a command or the printer information acquired from the operating system 301, it is possible for the communication with the reselected printer 2 to reliably succeed. Therefore, it is possible to prevent the reselection process from being executed a plurality of times and to further shorten the period during which communication errors are generated with the printer 2.

Here, each of the embodiments described above shows only one embodiment of the invention, and arbitrary modifications and applications are possible within the scope of the invention.

For example, in addition to the parameters described above, the received URL scheme information may include parameters defining the control of the cutter 266 or may include parameters defining control of the transport motor 264. Furthermore, the received URL scheme information may include parameters defining control of the device connected to the printer 2.

In addition, for example, it is also possible to realize the function of the print app execution unit 303 in the form of a non-transitory processor readable medium which stores the printer app 312, a server device which distributes the printer app 312, a transmission medium which transmits the printer app 312, a data signal in which the printer app 312 is realized in a carrier wave, or the like. As the non-transitory processor readable medium, it is possible to use various media able to be read by a computer (processor) and the non-transitory processor readable medium may be any type of magnetic or optical non-transitory processor readable medium or medium using a semiconductor memory device, or other kinds of storage media may be used. In addition, the non-transitory processor readable medium may be a portable non-transitory processor readable medium such as a memory card. In addition, the non-transitory processor readable medium may be a non-transitory processor readable medium provided in a device connected to the device described above via a communication line.

In addition, for example, in a case where the control method (terminal control method) of the tablet terminal 3 described above is realized using a computer provided in the tablet terminal 3 or an external device connected to the tablet terminal 3, it is also possible to configure the invention in the form of a program executed by a computer (processor) in order to realize the method described above, a recording medium in which the program is recorded to be readable by a computer (processor), or a transmission medium for transmitting the program. As the recording medium, it is possible to use a magnetic or optical recording medium or a semiconductor memory device. Specific examples thereof include a portable or fixed recording medium such as a flexible disk, a hard disk drive (HDD), a compact disc read only memory (CD-ROM), a digital versatile disk (DVD), a Blu-ray (registered trademark) disc, a magneto-optical disc, a flash memory, or a card type recording medium. In addition, the recording medium described above may be a non-volatile storage device such as a random-access memory (RAM), a read only memory (ROM), or an HDD, which is an internal storage device provided in the tablet terminal 3 or an external device connected to the tablet terminal 3. This also applies to the control method of the printer 2.

In addition, although a case is exemplified where the functions of the terminal control unit 300 and the printing device control unit 200 are realized by one processor, the functions may be realized by a plurality of processors or semiconductor chips. For example, the terminal control unit 300 and the printing device control unit 200 may be configured to be further provided with a sub-processing device (co-processor) such as a System-on-a-Chip (SoC), a Micro Control Unit (MCU), or a Field-Programmable Gate Array (FPGA). In addition, the terminal control unit 300 and the printing device control unit 200 may cause both the CPU and the sub-processing device to cooperate, or may selectively use one of the two to perform various types of control.

In addition, for example, the processing units in FIG. 5A and FIG. 5B and FIG. 10 are divided according to the main process contents in order to make the processes easier to understand, and the invention is not limited by the manner of dividing the processing units or the names thereof. Depending on the process content, the invention may be further divided into a greater number of processing units. In addition, the invention may be divided such that one processing unit includes a greater number of processes. In addition, the order of the processes may be appropriately changed in a range not obstructing the gist of the invention.

Figure 3:
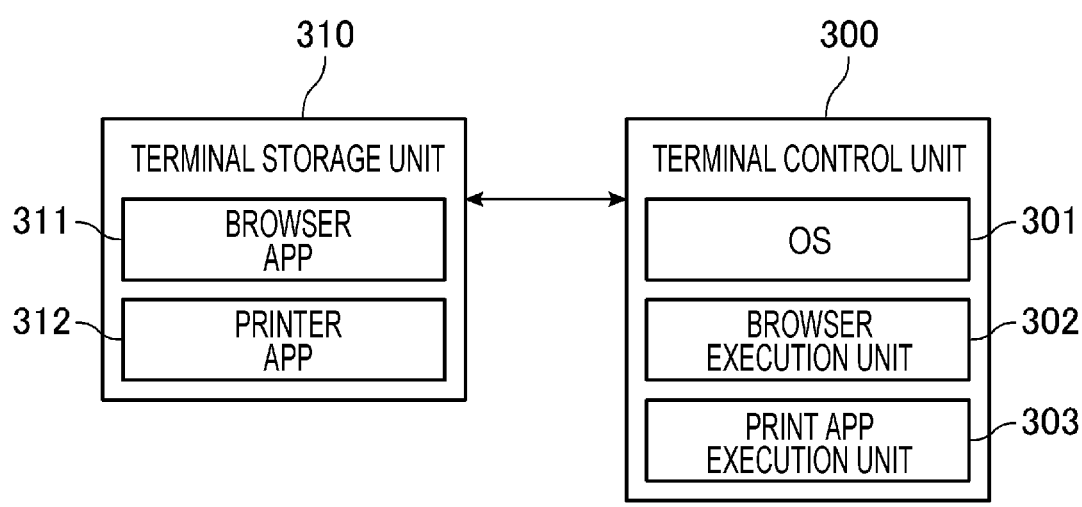
FIG. 3 is a functional block diagram of a terminal control unit (processor) and a terminal storage unit (storage).

In addition, each of the functional units shown in FIG. 1, FIG. 2, and FIG. 3 represents a functional configuration, and the specific embodiments thereof are not particularly limited. That is, it is not always necessary to mount hardware corresponding to each functional unit individually, but it is of course possible to have a configuration in which the functions of a plurality of functional units are realized by executing a program using one processor. In addition, some of the functions realized by software in the above-described embodiments may be implemented by hardware, or some of the functions realized by hardware may be realized by software. In addition, it is possible for specific detailed configurations of the tablet terminal 3 and other parts of the printer 2 to be arbitrarily changed without departing from the gist of the invention.

What is claimed is:

1. A non-transitory processor readable medium storing a printer program read out and executed by a processor in a terminal connectable to a printer to execute steps including:
    acquiring first information which is structured by a URL scheme and in which a process for when a communication error with the printer is generated is specified, from an upper level program of the printer program;
    determining whether a communication error with the printer is generated; and
    in response to determining that a communication error with the printer is generated, executing a reselection process of the printer based on the first information without notifying the upper level program of generation of the communication error.

2. The non-transitory processor readable medium storing a printer program according to claim 1,
    wherein the steps further include:
    notifying the upper level program of communication success when the reselection process is executed such that communication with the printer is successful.

3. The non-transitory processor readable medium storing a printer program according to claim 2,
    wherein the terminal is provided with a display, and
    the steps further include:
    causing the display to display a reselection screen which is a screen for the reselection process for when a communication error with the printer is generated; and
    causing a display on the display to shift from the reselection screen to an upper level program screen showing the upper level program when the reselection process is executed such that the communication with the printer is successful.

4. The non-transitory processor readable medium storing a printer program according to claim 3,
    wherein the reselection screen displays printer information indicating the printer in a selectable manner, and
    the printer information includes information acquired by broadcasting a command or information acquired from an operating system.

5. The non-transitory processor readable medium storing a printer program according to claim 1,
    wherein the first information includes printing destination information which specifies a printer, printing information, and reselection process information, and the steps further include:
causing the printer specified by the printing destination information to prepare to transmit the printing information;
executing the reselection process based on the reselection process information when a communication error with the printer is generated; and
changing the printer for which the communication error is generated to the printer selected in the reselection process and transmitting the printing information.

6. A terminal, which is able to communicate with a printer, comprising:
a memory which stores a printer program and an upper level program of the printer program; and
a processor which reads out and executes the upper level program and the printer program from the memory,
wherein the processor is configured to:
generate first information, which is structured by a URL scheme and in which a process for when a communication error with the printer is generated is specified, by reading out and executing the upper level program from the memory,
determine whether a communication error with the printer is generated, and
in response to determining that a communication error with the printer is generated, execute a reselection process of the printer based on the first information without notifying the upper level program of generation of the communication error, by reading out and executing the printer program from the memory.

7. The terminal according to claim 6,
wherein the processor is configured to notify the upper level program of communication success when the reselection process is executed such that communication with the printer is successful.

8. The terminal according to claim 7, further comprising:
a display,
wherein the processor
displays a reselection screen which is a screen for a reselection process on the display when a communication error with the printer is generated, and
shifts the display on the display from the reselection screen to an upper level program screen showing the upper level program when the reselection process is executed such that the communication with the printer is successful.

9. The terminal according to claim 8,
wherein the reselection screen displays printer information indicating the printer in a selectable manner, and
the printer information includes information acquired by broadcasting a command or information acquired from an operating system.

10. The terminal according to claim 6,
wherein the first information includes printing destination information for specifying the printer, printing information, and reselection process information, and
the processor
prepares to transmit the printing information to the printer specified by the printing destination information,
executes the reselection process based on the reselection process information when a communication error with the printer is generated, and
changes the printer for which the communication error is generated to the printer selected in the reselection process and transmits the printing information.

11. A method of controlling a terminal, which is able to communicate with a printer, the method comprising:
executing a printer program and an upper level program of the printer program,
generating first information which is structured by a URL scheme and in which a process for when a communication error with the printer is generated is specified, using the upper level program,
determining whether a communication error with the printer is generated, and
in response to determining that a communication error with the printer is generated, executing a reselection process of the printer based on the first information without notifying the upper level program of generation of the communication error.

12. The method of controlling a terminal according to claim 11,
wherein
the upper level program is notified of communication success when the reselection process is executed such that communication with the printer is successful.

13. The method of controlling a terminal according to claim 11,
wherein the terminal includes a display, and
the method further comprises:
displaying a reselection screen which is a screen for a reselection process on the display when a communication error with the printer is generated; and
shifting a display on the display from the reselection screen to a screen showing the upper level program when the reselection process is executed such that the communication with the printer is successful.

14. The method of controlling a terminal according to claim 11,
wherein the first information includes printing destination information for specifying the printer, printing information, and reselection process information, and
the method further comprises:
preparing to transmit the printing information to the printer specified by the printing destination information,
executing the reselection process based on the reselection process information when a communication error with the printer is generated, and
changing the printer for which the communication error is generated to the printer selected in the reselection process and transmitting the printing information.

15. The method of controlling a terminal according to claim 14,
wherein the reselection screen displays printer information indicating the printer in a selectable manner, and
the printer information includes information acquired by broadcasting a command or information acquired from an operating system.

* * * * *